United States Patent [19]

Carstensen

[11] 4,436,158

[45] Mar. 13, 1984

[54] RELEASABLE DRILL STRING DEVICE AND METHOD

[76] Inventor: Kenneth J. Carstensen, 4540 N. 44th St., No. 70, Phoenix, Ariz. 85018

[21] Appl. No.: 330,958

[22] Filed: Dec. 15, 1981

[51] Int. Cl.³ .............................................. E21B 17/10
[52] U.S. Cl. ...................................... 166/377; 29/460; 175/325; 175/17; 166/61
[58] Field of Search ............... 166/179, 203, 206, 241, 166/242, 376, 60, 377, 61; 285/21, 41, 284; 175/325, 17; 403/265, 266, 267, 268, 269; 269/7; 29/460, 447, 426.4, DIG. 35; 164/408, 110

[56] References Cited

U.S. PATENT DOCUMENTS

| | | | |
|---|---|---|---|
| 1,617,489 | 2/1927 | Lightfoot | 166/61 X |
| 1,863,855 | 6/1932 | Jenkins | 285/21 X |
| 2,499,456 | 3/1950 | Browne | 29/447 X |
| 2,756,474 | 7/1956 | Steinmetz | 285/21 X |
| 2,955,338 | 10/1960 | Gough | 403/269 X |
| 2,992,838 | 7/1961 | Wallace | 285/21 |
| 3,193,918 | 7/1965 | Heldenbrand | 29/447 |
| 3,499,210 | 3/1970 | Schellstede et al. | 29/447 |
| 3,578,084 | 5/1971 | Bombardieri et al. | 166/241 X |
| 3,664,693 | 5/1972 | Irons | 403/269 X |
| 4,323,526 | 4/1982 | Hilbush | 285/21 X |

Primary Examiner—Ernest R. Purser
Assistant Examiner—Michael Starinsky
Attorney, Agent, or Firm—Fraser & Bogucki

[57] ABSTRACT

A drill string working tool is provided that may be releasably engaged to and removed from a drill string member. The tool, such as a cylindrical stabilizer body, is positioned around a cylindrical drill string member, the inner diameter of the stabilizer body being greater than the outer diameter of the drill string member, so as to provide an annular cavity between the stabilizer body and the drill string member. A heating element disposed within a protective outer sheath is mounted axially along the inner surface of the stabilizer body. For installation, a low melting point solid material such as zinc or a zinc alloy is poured in to substantially fill the annular cavity. The stabilizer compression preloads the zinc onto the drill string member, and thus the stabilizer body is non-rotatably attached to the drill string member. For removal, the low melting point fill material is removed from the annular cavity by remelting with the interior heating element and pouring out the fill material. The stabilizer body can then be released and slipped off the drill string member.

38 Claims, 9 Drawing Figures

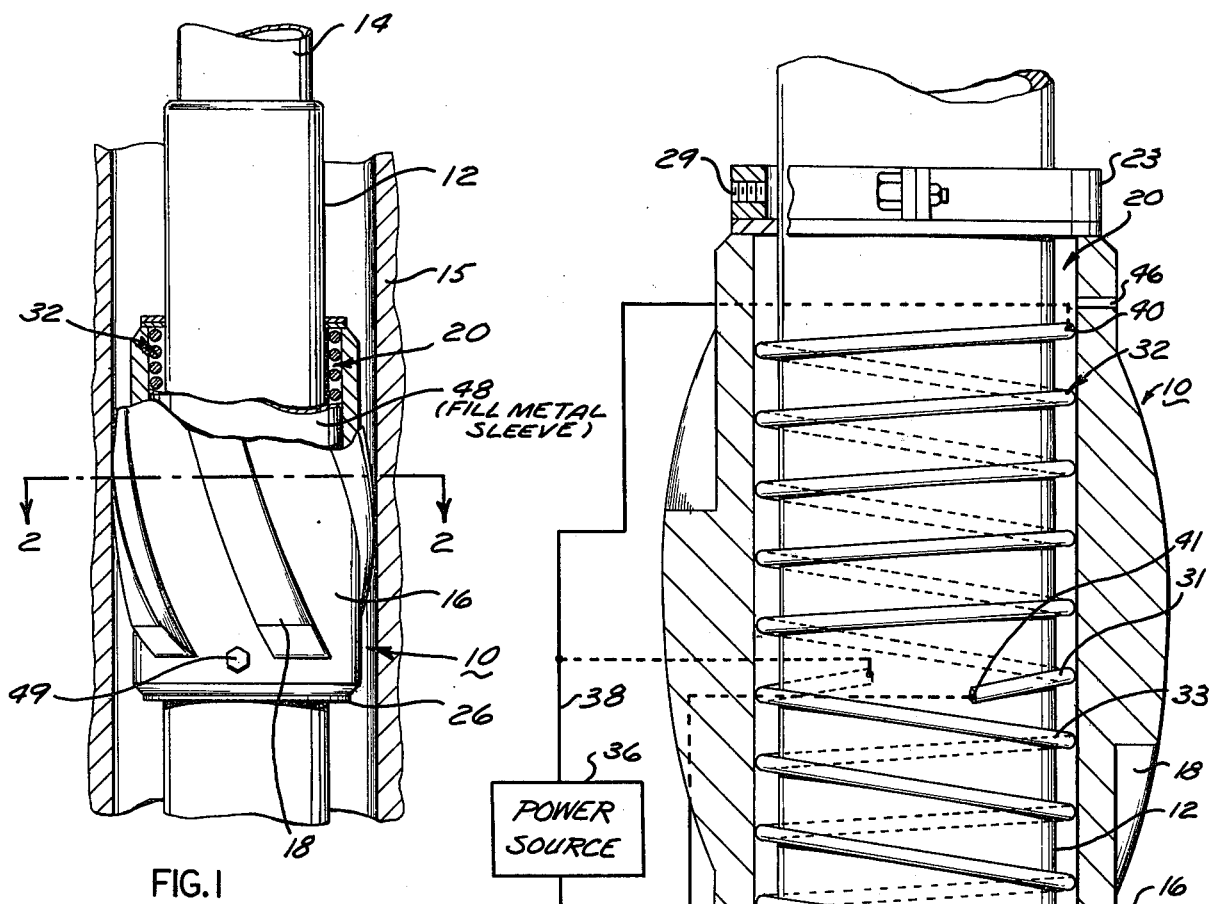
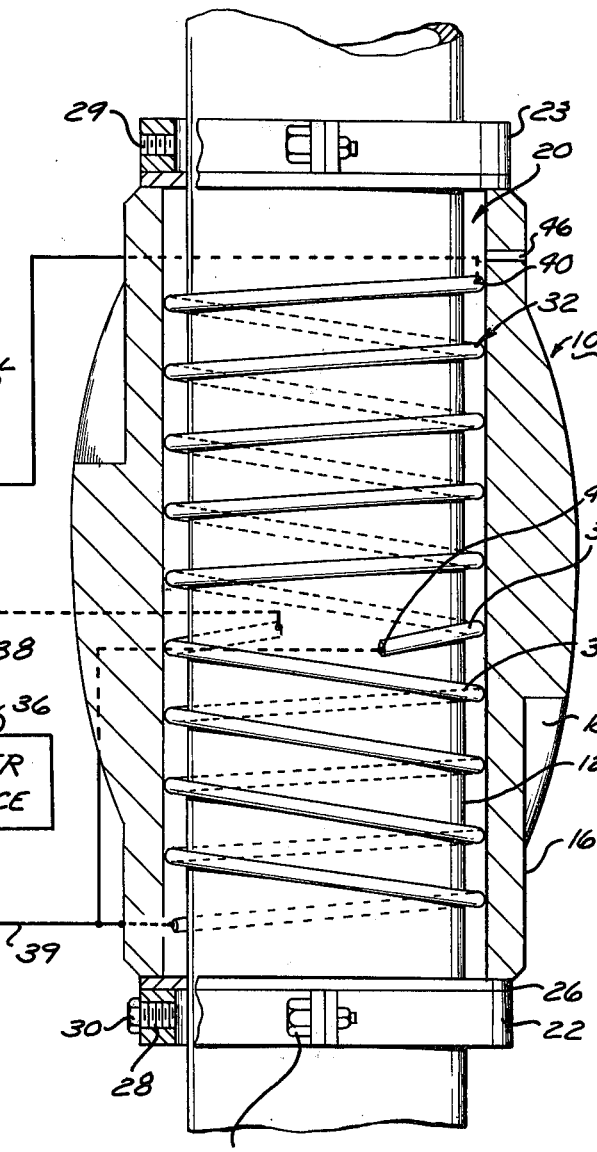
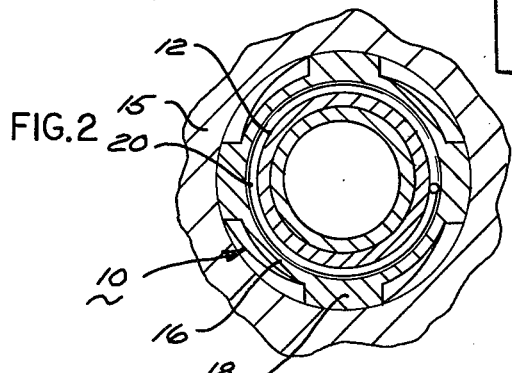
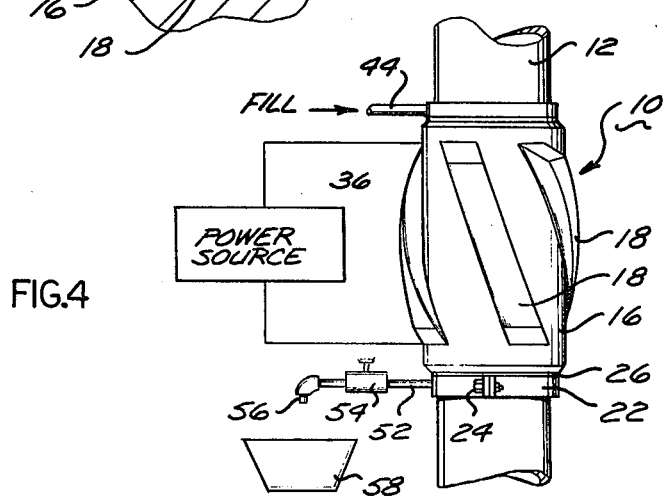
FIG. 1
FIG. 2
FIG. 3
FIG. 4

RELEASABLE DRILL STRING DEVICE AND METHOD

BACKGROUND OF THE INVENTION

The present invention relates to rotary bore hole apparatus, and more particularly to replaceable working tools and devices used with drill strings or tubular products for special purposes.

It is often required in drilling operations to use a member or device for a temporary purpose at some point or region along the drill string. For example, a stabilizer is a device which is mounted on a drill string section or collar to control lateral deflection of the drill string in that region and prevent the drill string from contacting the sides of the well bore hole. The stabilizer comprises a device of larger diameter, usually having curved blades that have hardened outer faces, that can maintain the drill string concentric even though the bore hole is curved. Most such stabilizers are attachable in-line, as another element in the drill string, and therefore must be threaded into the string in series with pipe and collar elements. There are many problems encountered in the use of these devices, including thread or shoulder seal damage during improper makeup. The use of added tool joints in the string increases the number of points at which twist-off and wash-out failures can occur, and increases the chances of loss or sticking of the stabilizer in the bore hole. Such devices cannot be mounted at freely chosen positions along the drill collars, and are usually large, heavy and expensive. Further, installation and removal of such stabilizers must be done on the rig floor, entailing corresponding high expenses for equipment and crew.

Releasable or removable drill string stabilizers have therefore been devised that can be mounted at selected locations along the length of a drill collar, by various disengageable mechanical means. Threaded, clamping, wedging and other arrangements have been employed for holding the stabilizer in position during use and subsequently permitting removal. All are essentially friction-locking devices, as exemplified by U.S. Pat. Nos. 4,245,709, 4,258,804 and 4,275,935. These devices are however subject to numerous problems when used in practical situations. For example, when used in directional (i.e. curved or angled) holes, the bending and torsion forces exerted on a friction device tend to cause it to lose its grip or fail, depending upon the amount of torque exerted during make-up. Devices which slip can ride down the drill string and be collected on the top of the bit. Moreover, if a friction-locking device is attached to a worn drill collar, there is often insufficient gripping surface because collars can have an egg shape or out of round distortion. When the friction members are damaged or worn during use, extended down time is often required to remove them from the drill collar. Releasable stabilizers as heretofore employed are also expensive devices having limited useful life.

The stabilizer is merely one example of a device or tool that can advantageously be removably attached to a drill string. Roller reamers and midcollar hardbands are other examples of devices that have a larger outer diameter than a drill string section on which they are mounted. The former are commonly used for bore hole sizing and the latter are used in counteracting excessive wear that sometimes arises with abrasive formations. Also down-hole stabilizers and other devices are sometimes used with heavyweight tubular sections that are employed in high load bearing regions of a drill string and present different operative problems. It is desirable that removable tools be usable in this context as well.

It should be recognized that stabilizers and other down-hole devices that engage bore hole walls can be subjected to extremely high circumferential forces that accentuate the mechanical problems. In addition, high linear forces can be encountered when running in or pulling out of tight holes or damaged casing. An ability to withstand these forces without slippage or disengagement is a primary requirement for field use.

The present invention provides economic releasably attachable drill string devices adapted to be mounted on a drill string member, without using friction-type elements or components for engagement or disengagement.

SUMMARY OF THE INVENTION

In accordance with the present invention, releasable drill string devices and methods are based upon the interposition of a meltable stress bearing layer between the drill string member and an encompassing device. Interior heating means in the region occupied by the layer may be used to create and remove the layer.

As one example, a low melting point metal such as zinc or a zinc alloy is used to fill an annular cavity between the inner diameter of a stabilizer and the outer diameter of a drill collar. When the metal is poured in place and solidified, it non-rotatably attaches the stabilizer to the drill collar and distributes torsional peripheral forces exerted on the stabilizer across broad surface areas. The fill metal not only mechanically adheres to both surfaces but the arrangement also insures that the stabilizer is preloaded in compression onto the fill member which in turn is compression stressed against the drill collar. Following use in the bore hole the stabilizer is readily removed from the drill string member by melting the metal fill with an integral interior heater that is externally energized. Upon melting the fill metal flows out of the interior cavity and the stabilizer may be slipped off the drill string.

More particularly, a stabilizer for positioning on a drill collar according to the invention comprises a cylindrical stabilizer body having a heating means mounted adjacent the inner surface of the stabilizer body. Such heating means may be in the form of a heating coil, such as Nichrome, extending substantially along the axial length of the stabilizer body in a helical or sinuous path. The coil may be disposed within a protective outer sheath, such as stainless steel or other material that is not attacked by molten zinc, and may comprise more than one section to attain the temperature levels needed using available voltages. The stabilizer body has an inner diameter greater than the outer diameter of the drill collar, so that when positioned axially around a cylindrical surface of a drill string member, an annular cavity is defined between the stabilizer body and the drill collar. This cavity is accessible through upper fill hole and lower drain holes that is closed until the interior fill material is to be removed.

While maintaining the stabilizer body in a selected position axially along the drill collar, as by means of a mounting annulus, a power source is attached to the opposite ends of the heating wire coil, by means of suitable terminals, to preheat the stabilizer and the interior annular cavity to an elevated temperature. A low melting point material, e.g. one having a melting range of from 500° F. to 1000° F., such as zinc or a zinc alloy, e.g. a zinc-aluminum alloy, is heated to the molten state, and is poured into the cavity, the walls of which are preheated by energizing the heating coil. The molten fill metal flows into the cavity to fill the entire annular space along substantially the entire axial length of the stabilizer body. A closure such as a plugged drain port on a retainer collar or other means supporting the bottom of the stabilizer body on the drill collar prevents the molten material from flowing out of the cavity. When the cavity is filled the external power source is disconnected and the electrical terminals are covered with protective caps. The fill metal quickly solidifies because the drill collar acts as a massive heat sink, and the entire operation is complete within a few minutes. The attachment (and disengagement) can be carried out at the pipe rack, or alternatively on the drill rig floor, and the drill collar can be vertical or horizontal.

When zinc, which melts at about 780° F., is employed as the low melting point material, the stabilizer body is preheated from about 350° to about 450° F. As the fill metal solidifies quickly within the cavity, it first gives up heat to the stabilizer but then continues cooling down at a rate faster than the stabilizer, because the most significant heat sink is the thermally conductive collar and not the external environment. Thus the metal fill contacts and adheres to both the exterior collar surface and the interior stabilizer surface and the stabilizer heat shrinks onto the metal fill. Consequently the stabilizer preloads the entire assembly in compression, enabling high torsional forces to be resisted.

After solidification of the metal fill and attachment of additional stabilizers as desired, the drill string assembly containing the stabilizer or stabilizers may be lowered into a bore hole for drilling operations. Following use and removal of the drill string containing the stabilizer from the bore hole, the stabilizer may be detached. For this purpose the retainer collar is mounted around the bottom of the stabilizer, and the drain port therein is unplugged and a spout is attached. A power source is connected to the terminals of the interior heater of the stabilizer and the heater element is energized so as to heat the stabilizer and the adjacent zinc sleeve to a temperature of about 780° F., sufficient to melt the zinc. When the zinc has become molten, the valve on the drain spout is opened, permitting the zinc to flow into a recovery container. The supporting collar and pour spout are removed, and the released stabilizer can be slipped along the drill string member and removed. Both the detached stabilizer and the recovered zinc can again be used for mounting the same or other stabilizers at any desired location along the drill string.

Roller reamers in accordance with the invention may be attached and removed in the same manner as the stabilizers. Further, replaceable mid-collar hardbands may also be installed and removed on the same basis. This enables field use of prefabricated components that compensate for or resist unusual wear conditions and is far less costly and complex than currently used procedures.

A different construction in accordance with the invention enables side mounting of a stabilizer or other devices and is particularly adapted for use with heavyweight pipe sections having large tool joints at each end. In this construction, the stabilizer body comprises two longitudinally split sections having dovetail mating side edges. Each section incorporates its own heating element or elements, and when fitted together and joined by split ring end collars the stabilizer may receive a removable metal fill as previously described.

It is thus seen that the stabilizer and the means for attaching same to a drill string according to the invention, eliminates the use of various friction type devices, e.g., mechanical clamping means for attaching the stabilizer to a drill string, eliminates added tool joints, eliminates galling of threads during improper makeup, and is much safer to utilize and handle, as compared to friction type stabilizer attachment devices. The invention also reduces the possibility of a stabilizer breaking off at a connecting joint or sticking in the bore hole and breaking off, requiring a fishing job to recover the stabilizer. Further, less damage to the stabilizer occurs during usage, and the stabilizer can readily be placed at any location desired along the drill string, depending upon bore hole conditions. This is especially useful for curved or slant drilling, because when a stabilizer can be positioned at the exact needed distance from a bit it can serve as a fulcrum point to increase or decrease angle and control direction.

BRIEF DESCRIPTION OF THE DRAWINGS

The invention will be more clearly understood by reference to the following description, taken in connection with the accompanying drawings wherein:

FIG. 1 is an elevational view, partly in section, showing a stabilizer in accordance with the present invention attached in operative position on a drill collar section;

FIG. 2 is a top sectional view, taken on line 2—2 of FIG. 1 and looking in the direction of the appended arrows;

FIG. 3 is a side view partly in section showing the stabilizer of FIG. 1 in a selected position on a drill collar section, preparatory to attaching the stabilizer in a fixed non-rotatable position on the drill collar section, including means for attaching the stabilizer to the drill collar section;

FIG. 4 is a side view of the stabilizer-drill collar section combination of FIG. 1, including means for disassembling the stabilizer from the drill collar section;

DETAILED DESCRIPTION OF THE INVENTION

Figure 5:
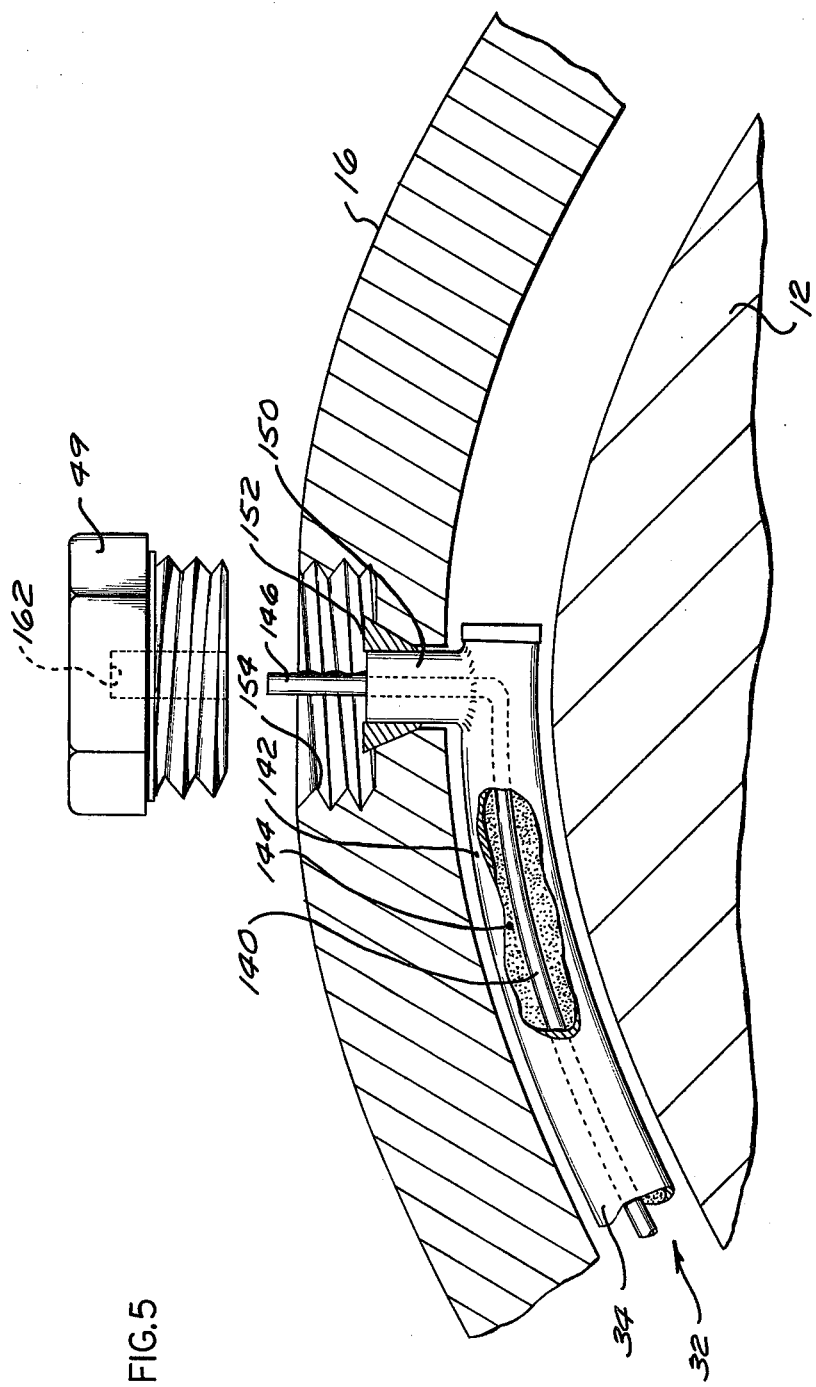
FIG. 5 is a perspective fragmentary view, partly broken away, of a portion of a heating element mounted adjacent the interior surface of the stabilizer.

As illustrated in FIGS. 1 and 2 of the drawings, a stabilizer 10 is to be firmly secured in a desired location on a drill string member such as a drill collar 12 forming part of a drill string 14 disposed in a well bore 15. Stabilizers are merely one example of specialized drill devices and tools that may desirably be attached in removable fashion to a drill string. Reamers, guides, hardbands and other devices can beneficially be secured in the same way as mentioned in part below.

The stabilizer 10 comprises a cylindrical stabilizer body 16 having circumferentially spaced, helically curved stabilizer blades or ribs 18 extending outwardly to contact the sides of the well bore. The arrangement shown is merely one example because the stabilizer blades may be axially disposed and may number from two to four in typical devices. Hardened outer surfaces on the blades 18 may be replaceable components coupled to the structure in conventional fashion. Referring also to FIG. 3, the internal diameter of the stabilizer body 16 is greater than the external diameter of the drill collar 12, which enables the stabilizer body to be slipped over the collar to a desired location along its length at which the stabilizer is to be secured. There is thus formed an annulus or annular cavity 20 between the inside surface of the stabilizer body 16 and the external surface of the drill collar section 12.

When the stabilizer 10 is positioned in the desired location on the drill collar section 12, a lower retainer collar 22 is mounted, by means of suitable fasteners or bolts 24, to the drill collar section 12 at the bottom of the stabilizer body 16. The collar 22 supports the stabilizer body 16 in fixed position on the drill collar section 12 and defines a bottom closed end for the cavity. An asbestos collar gasket 26 is attached to the upper surface of the retainer collar 22 and in contact with the lower surface of the stabilizer body to make contact with the molten metal that is to fill the cavity. A drain port 28 is provided in the collar 22, such drain port being in communication with the annular cavity 20 between the stabilizer body 16 and the drill collar section 12. A threaded plug 30 (FIG. 3 only) which is of low exterior profile is seated in the drain port 28 to close the cavity.

In the present example the stabilizer 10 is shown as it is attached when the collar section 12 is in the vertical position on the rig floor. In this attitude gravity flow into the annular cavity 20 requires a seal only at the bottom of the unit. Alternatively, however, the stabilizer 10 and collar section 12 can be horizontal, as on the pipe rack, and this requires that the upper end of the annular cavity be closed and the stabilizer be held concentric by another retainer collar 23 at the opposite end. A second asbestos seal is used so that the molten metal can be retained between the two. Also one or more closeable fill holes 29 are provided in the side wall of the stabilizer 10 or one of the retainer collars 22, 23 to provide an entry for fill metal into the annular cavity. The ability to install and remove devices separately from the drill rig, in the yard or on the pipe rack, is much safer for the rig hands, enables much better planning and more efficient use of time, and can avoid entirely the use of expensive rig floor time.

The stabilizer 10 has mounted on the inner surface thereof an electrical resistance heating element 32, such as a Nichrome rod, extending from the upper end of the stabilizer body 16 to the lower end thereof and extending substantially along the axial length of the stabilizer body. The heating element 32 has a protective sheath or cover 34, and a thermally conductive interior powder filler, as described below in conjunction with FIG. 5.

In this example, the heating element 32 is divided into two helical sections 31 and 33 which are wound oppositely, section 31 having terminals 40, 41 at opposite ends thereof and section 33 having like terminals at opposite ends. In the mid region the ends slightly overlap so that no cold spots exist in a gap region between the two sections 31, 33. An external power source 36 or supply voltage is connected to the terminals 40, 41 of each of the sections as noted below.

Two heating element sections are used because the voltage drop across a full length resistor element would be too great to reach the temperature levels needed for most full length stabilizers of large diameter. A single heating element can however be employed for short length stabilizers and other devices. In practice a field available voltage in the range of 220 to 240 volts A.C. and a current of about 42 amps is applied separately to the two sections 31 and 33 of the heating element 32 to provide the needed heat input. An equivalent D.C. voltage can be employed with those land and offshore rigs which employ D.C. for primary power. This approximate power input heats the solidified fill metal to approximately 1850° F. in approximately two minutes or preheats the stabilizer to approximately 400° F. in about two minutes, enabling installation and removal operations to be carried out in 4–8 minutes. Heating rates are dependent on part sizes, spacings and ambient conditions, and speed is not as significant for off-rig operations. Where installation and removal are to be done as quickly as possible, insulated auxiliary heaters (not shown) may be used at each end of the device during the heating interval. The sheath 34 containing the heater coil 32 may be retained in a peripheral notch or groove (not shown) on the interior surface of the stabilizer body 16, that seats the sheath 34 and reduces potential problems with molten metal leaking into the electrical connections.

When the stabilizer body 10 is thus positioned on the drill string collar section 12 and maintained in position by the retainer collars 22, 23 the power source 36 is connected by means of leads 38, 39 to the terminals 40, 41 for the two ends of each heating section 31, 33. The heating element 32 preheats the internal surface of the stabilizer body 10 to a temperature of 350° to 400° F. in anticipation of receiving the metal fill. Concurrently or separately, as seen in FIG. 4, a pour pan assembly or other source (not shown) is mounted adjacent the upper end of the stabilizer 10, with the fill spout 44 of the pour pan in communication through the fill hole 29 with the annular cavity 20 between the stabilizer and the drill collar section 12. In this example the fill material is a zinc alloy of 95% zinc and 5% aluminum, although other compositions may be used as circumstances dictate. A molten metal having relatively low (e.g. less than about 1000° F.) melting point is preferred for most applications because of tensile strength, thermal conductivity and reusability. For other applications, however, different remeltable materials may be employed. The fill metal is then poured into the annular cavity 20 until the molten metal substantially fills the cavity 20 from the top to the bottom of the stabilizer 10, up to an overflow port 46 (FIG. 3 only).

The leads 38, 39 from the power source are then removed and the molten fill in the annular cavity 20 is allowed to solidify and cool down. During the time of filling and cooling the stabilizer body 16 is first heated further by the molten fill metal, but the fill metal cools more rapidly because of the heat sink presented by the larger collar section 12. A solid zinc alloy sleeve 48 (FIG. 1 only) formed in the cavity 20 adheres to both facing surfaces but cools down faster than the stabilizer body 16. Thus the zinc alloy sleeve 48 is preloaded in compression thereafter as the stabilizer body 16 continues to cool, and this compressive force is exerted in turn by the fill metal sleeve 48 against the collar section 12.

Consequently the stabilizer 10 is securely and non-rotatably attached to the drill collar section 12.

The width of the annular cavity 20 is about 0.300 to 0.450 inches in order to provide a solid zinc alloy sleeve 48 of sufficient volume. The tensile strength of the stated zinc alloy is in excess of 20,000 psi and because of the length of the structure is much more than adequate to withstand the stresses induced in bore hole operation. The fill spout 44 is disconnected for bore hole operation and the electrical terminals are protected by low exterior profile threaded plugs 49 (FIGS. 1 and 5 only). The retainer collars 22, 23 are removed before entry into the hole and the collar gaskets 26 may be removed if desired but are designed to be left in place.

The resulting assembly of the stabilizer 10, securely mounted on the drill collar section 12 and containing the solid zinc sleeve 48 between the stabilizer and the drill collar section, is now ready for insertion into a well bore for continued drilling of the well bore. It will be noted that during the drilling operation the drilling system is always cooled by circulation of drilling fluid down the well bore, so that the heat generated during drilling is insufficient to raise the temperature of the zinc sleeve 48 to a temperature that is sufficiently high to melt the zinc. Differential expansion between the stabilizer 10, and the zinc fill 48 and the drill collar section 12 is limited and does not present any problem. Torsional forces exerted on the blades 18 of the stabilizer are distributed throughout the entire interior surface area of the stabilizer contacted by the metal fill 48. This distribution of forces means that the shear stresses are relatively low even at high loading forces. The system has structural strength that is more than adequate to withstand the high torques encountered during the drilling operation, which can exceed 100,000 ft. lbs.

Following a period of drilling, as for purposes of relocating the stabilizer 10 on the drill string, the assembly including the stabilizer 10 is removed from the well bore, and the collar section 12 can be removed from the drill string and set up on a convenient work platform. The drain port 28 is opened by removal of the plug 30, and a spout 52 is connected to the drain port, such spout containing a valve 54 and communicating with a discharge nozzle 56, as best seen in FIG. 4. The electrical terminals 40, 41 are uncovered by removing the protective caps 49 used during bore hole operation. The power source 36 is again connected via leads 38, 39 to the terminals 40, 41 of the heating element 32, to heat the coil and the adjacent zinc sleeve 48 to a temperature of greater than 780° F., causing the zinc alloy to remelt. The valve 54 of drain spout 52 is then opened, permitting the molten zinc to flow via the drain port 28 and spout 52 through discharge nozzle 56, and into a recovery pan 58. Due to the use of the interior heating element 32 as the means for melting the zinc, efficient localized heating of the zinc sleeve 48 is achieved. Even if the collar section 12 is in a drill string, there is no inordinate transfer of heat to any substantial length of the drill string above or below the drill collar section 12.

When the zinc alloy has thus been removed from the annulus 20, the end collars 22, 23 can be released and the stabilizer 10 is free to be slipped off the drill collar section 12. The stabilizer thus removed can be replaced and relocated at another desired section on a collar or relative to the bit on the drill string. The recovered zinc can be again reused for securely attaching the stabilizer or other stabilizers at other locations on the drill string. Heating elements can be reused many times but typically are replaced periodically to avoid problems in the field.

It will be understood that any other meltable, preferably low melting point, material which is nonreactive with the metals of the drill string and the stabilizer, generally formed of steel, and which permits compressive preloading of the stabilizer and on the drill string member, can be utilized. Thus, for example, a zinc-aluminum alloy such as Prestal, consisting of 78% zinc and 22% aluminum, by weight, can be employed in place of the zinc. Further, in place of a stainless steel protective sheath 34 for the helical heater coil 32, there can be employed a ceramic cover or sheath.

From the foregoing, it is seen that the invention provides a simple relatively inexpensive system for quickly and releasably securing a stabilizer or other device to a drill string member. Both installation and removal can be accomplished in 4 to 8 minutes, whether on the rig floor or elsewhere, and without requiring special power tools. The invention avoids the use of mechanical devices such as clamps and the like, for this purpose, with their attendant disadvantages noted above. By employment of the concepts disclosed, secure engagement between the stabilizer and the drill string member is obtained through the compressive preloading of the stabilizer body onto the metal fill sleeve and the wide distribution of forces. The receiving member can have an eccentric shape or have poor surface condition, without adverse effects because the metal fill will conform to any such deviations. Consequently the arrangement withstands high loading factors such as high torque and high shear forces applied to the stabilizer, without disengagement of the stabilizer body from the drill collar during use. The present invention also is particularly advantageous for use with curved drilling strings, unlike prior art constructions in which the stabilizer collar cannot accommodate the curvature and tends to loosen or break under drilling conditions. In accordance with the present invention, the hardened zinc alloy, or other meltable material, conforms to the outside of the pipe and the inside of the stabilizer, and minimizes this problem by automatically compensating for such deviations.

While the invention is shown to have particular application for releasably attaching a stabilizer to various drill string members, other tools such as roller reamers and mid-collar hardbands also can be releasably attached to a drill string member, as is discussed below and shown in the drawings. It is important to note that with the present system and method stabilizers and other such tools can be located at a remote point from the drill bit or adjacent the drill bit, or with specific distances between them. There is virtually complete independence from standard drill string lengths in placement of stabilizers and other devices along the line of pipe sections.

Figure 6:
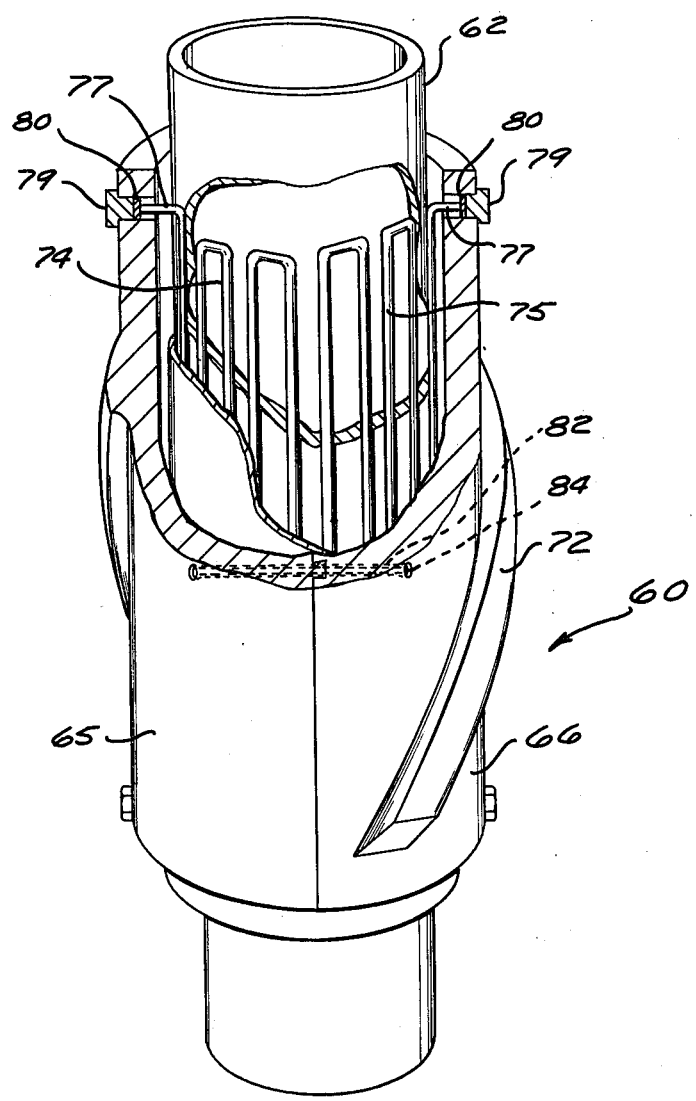
FIG. 6 is a perspective view, partially broken away, of a different stabilizer configuration in accordance with the invention.
Figure 7:
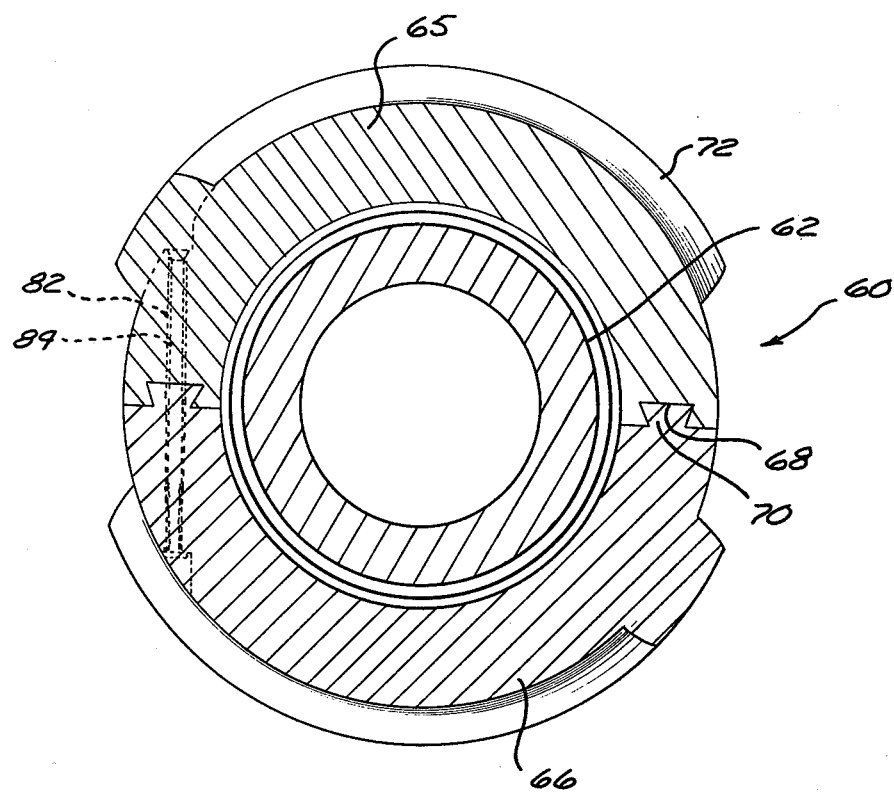
FIG. 7 is a cross-sectional view taken parallel to the central axis of the stabilizer of FIG. 6.

In some instances it is not convenient to slip a well tool over the end of an element such as a drill collar, and the exemplification depicted in FIGS. 6 and 7 provides a resolution of this problem. The stabilizer 60 depicted in FIGS. 6 and 7 is intended for application on a so-called heavyweight or heavy wall section 62, which is a drill string element for directional drilling, tapered drill strings and under high loading conditions. Conventionally, heavyweight sections, such as the section 62, incorporate large tool joints (not shown) at each end so that it is not feasible to slip a sleeve construction over the end. For this purpose, therefore, the stabilizer body is split into two sections, 65 and 66, that are relatively thick in cross-section. Grooves 68 in a first of the sections 65 have inset back corners, and receive longitudinal tongues 70 in a second of the sections 66 in mating relationship. Blades 72 are disposed in a curved path on the outside of each section 65, 66 of the stabilizer body. Each section 65, 66 incorporates its own heating element 74, 75 respectively disposed along the length of the section in serpentine fashion extending longitudinally from one end of the device to the other. This geometry permits somewhat more rapid filling and discharge of molten metal in the vertical position. At each longitudinal end of the heating elements 74, 75, there is a radially extending terminal lead 77 which, in operation, is protected by a threaded cap 79 which does not protrude upwardly from the outer circumference of the blades 72. A gasket 80 between the outside of the terminal lead 77 and the cap 79 protects against fill metal leakage.

The sections 65, 66 include tapered bores 82 extending through the tongues 70 on each side, normal to the central axis and tangential to the mid-radius of the cylindrical stabilizer 60 body. Tapered pins 84 are wedged into the bores 82 prior to down-hole operation and while the sections 65, 66 are still heated to prevent longitudinal shifting of one section relative to the other in the event of loss of structural unity for some reason.

With this construction, the stabilizer 60 is mounted on the heavyweight section 62 by sliding the two sections 65, 66 together with the grooves 68 and tongues 70 in mating relation. End collars may be attached to one or both ends, depending upon whether the unit is to be filled in vertical or horizontal position, and the energizing circuits are then coupled to the terminal leads 77 for preheating the assembly to receive the molten fill metal. When the fill process has been completed the unit is made ready for operational use by disconnecting the electrical circuits and installing the threaded caps 79 for down-hole use. The tapered pins 84 are forced into the bores 82 until tight.

The relatively thick sectioned stabilizer 60 body provides a high hoop strength structure for bearing the high loads exerted by heat shrinking of the stabilizer onto the metal fill and the interior heavyweight section 62. Although illustrated as a stabilizer, the split body technique can alternatively be used in a wide range of other applications. When the stabilizer 60 is to be removed the pins 84 are freed by impacting forces on the smaller ends and the fill metal is remelted so that the sections 65, 66 may again be separated.

Figure 8:
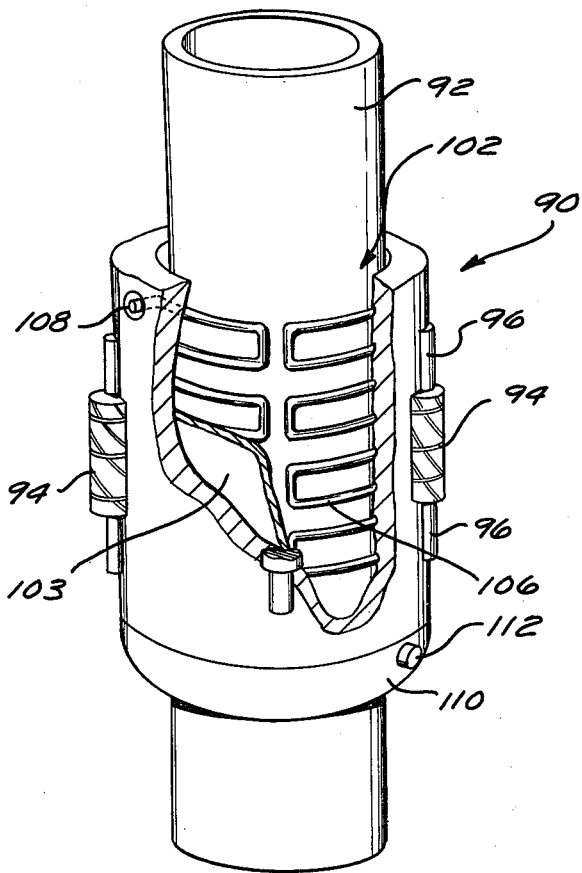
FIG. 8 is a perspective view, partially broken away, of a releasable roller-reamer in accordance with the invention.

A roller reamer device 90 in accordance with the invention is depicted in the broken away perspective view of FIG. 8. The roller reamer 90 is mounted coaxially on a pipe collar section 92, and comprises a number of peripheral rollers 94 having hardened output reaming surfaces. In conventional fashion, the rollers 94 may be replaceably mounted in end bearing blocks 96 coupled to the body 100 of the roller reamer device 90, at each longitudinal end thereof. The interior cylindrical surface of the body 100 defines, with the opposed outer surface of the pipe collar section 92, an internal annular cavity 102. As in the previous example, the cavity 102 contains the metal fill 103 adhering to both the outer surface of the pipe collar section 92 and the inner surface of the body 100. In this construction, the heating element 106 is differently configured from the prior examples, following a serpentine path in which the principal parallel elements are transverse to the longitudinal central axis of the device 90. The curved lateral heating element segments are intercoupled by short length integral elements at each end. Terminal beads 108 are taken out the side of the stabilizer body 100 in the fashion previously described. A single end collar 110 is shown in this example, although an upper end collar may also be used, and the metal fill 103 may be drained from the bottom end collar 110 by opening a removable end plug 112.

Again, this example of a device in accordance with the invention is advantageous in providing quick and secure attachment and ready removal of a roller reamer device from a collar or pipe section. The device 90 may be placed at any desired point along length of section to which it is to be attached.

Figure 9:
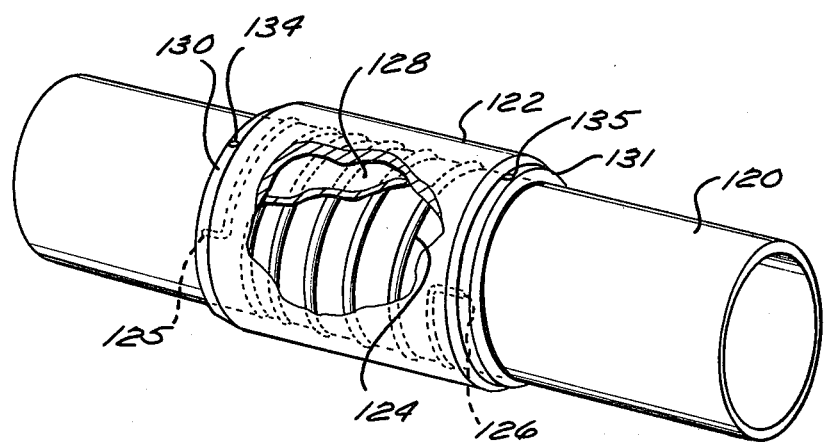
FIG. 9 is a perspective view, partially broken away, of a releasable mid-collar hardband for a collar or other tubular product.

It is necessary in many instances, referring now to FIG. 9, to provide a hardened wear resisting band on a collar 120 such as when a drill string is being operated in an abrasive formation. To resist this action, a hardband sleeve in accordance with the invention may be affixed on the pipe rack or on the rig floor, with substantial advantages over present techniques. The collar hardband comprises a sleeve 122 having a hardened outer surface that may be applied or repaired separately from drill operations, and an inner surface which defines the annular cavity relative to the collar 120 which the sleeve 122 encompasses. In this annular cavity is disposed a helical heating element 124 from which terminals 125 and 126 extend at each end. The flowable remeltable fill material 128 fills the annular cavity to end collars 130, 131 of slightly smaller exterior diameter. Protective covers for the terminals have not been depicted. The end collars provide end seals for the fill material, and fill and drain apertures 134, 135 leading to the interior cavity which may be plugged by insertable caps (not shown).

This arrangement may be filled by energizing the heating element 124 and pouring in the liquefied fill material 128 into the apertures 134, 135. Then, after solidification, the hardband device is ready for operation. The larger diameter central sleeve 122 absorbs the wear and the remainder of the drill collar 120 is not subjected to comparable wear. Subsequently, when wear has reached a limit point, collar 120 and hardband sleeve 122 are removed from the bore-hole and the end collars 130, 131 are replaced. The internal fill material 128 may then be remelted, poured off, and the sleeve 122 replaced by a new sleeve. The old hardband may be resurfaced or repaired at any convenient site. This avoids completely the major disadvantages of techniques currently in use, such as requiring hardband equipment to be available on the site and the use of high temperature materials applications for applying hardband surfaces, which usually introduces a substantial degree of thermal distortion.

FIG. 5 shows further details of the heating element 32 and the manner in which it may be mounted and protected in the system. The operative electrical resistive element comprises principally an elongated Nichrome rod 140 within a cylindrical protective sheath 142, preferably of stainless steel although high temperature ceramics may also be utilized that are resistant to the effects of molten zinc and zinc alloys. Within the protective sheath 142 and encompassing the Nichrome rod 140 on all sides is a thermally conductive, electrically insulative, powder 144 which enables heat transmission to the exterior and also provides physical protection by virtue of absorbing mechanical pressures and shocks on the protective sheath 142. The Nichrome rod 140 is angled adjacent its end to project radially outwardly relative to the central axis of the stabilizer. The end fitting or terminal 146 provides an external terminal to which a connector (not shown) coupled to a power source may be coupled through an aperture in the side of the stabilizer body 16. A mounting 150 such as a stainless steel outer cover with an electrically insulative structural interior sleeve is fitted about the terminal 146. An asbestos or other high temperature gasket 152 fitted about the mounting 150 provides a seal against external leakage of fill metal. Alternatively the outer end of the mounting 150 may be flared outwardly to seat against the conical surface of the aperture in which it sits. A threaded aperture 154 concentric with the external pin terminal 146 receives an appropriately threaded protective cap 49 which can be closed against the gasket 152 and which includes a central aperture 162 that receives the pin terminal 146. When thus mounted, the external portion of the protective cap 49 is a low profile structure that is well within the outer periphery of the stabilizer blades and therefore not acted upon by substantial outside forces when lowered in the bore hole.

Further, the inventive concept is of still broader scope and has other applications. Thus the concept can be applied for guiding any wall contacting tool for deviation control, and for securely and releasably mounting any member on a rotating shaft member for rotation therewith.

Although devices in accordance with the invention are particularly useful for the stabilizers, roller reamers and hardband devices that have been disclosed, they encompass any collar structure which is fitted around a section of drill string member, with a space being provided between the inner diameter of the outer device and the outer diameter of the inner member, within which a material that is meltable, e.g. in the range from 500° F. to 1000° F., is provided, together with an internal heater for remelting the material.

While various alternatives, modifications and variations of the invention will be apparent to those skilled in the art, the invention is not to be taken as limited except by the scope of the appended claims.

What is claimed is:

1. Apparatus for releasably securing a hollow cylindrical member around the outer surface of a cylindrical body which comprises:
   (a) a hollow cylindrical member positioned around the outer cylindrical surface of a cylindrical body, the inner diameter of said member being greater than the outer diameter of said body, so as to provide an annular cavity between said member and said body;
   (b) a heating means mounted adjacent said inner surface of said member in the annular cavity; and
   (c) a low melting point solid material disposed in said annular space, said member being heat shrunk onto said solid material, and said member and said solid material thereby being under compression on said cylindrical body, and thus non-rotatably attaching said member on said body, said low melting point material being flowable when melted and removable from said annular cavity when said material is heated to its melting point by said heating means.

2. The apparatus of claim 1, said low melting point material being zinc or a zinc alloy.

3. The apparatus of claim 1, said heating means being at least one electrical resistance element extending substantially throughout said cavity, said element being disposed within a protective outer sheath.

4. The apparatus of claim 1, further including sealing means disposed at at least one end of the hollow cylindrical member about the cylindrical body and providing a seal for the solid material when melted, said sealing means including removable means for permitting remelted solid material to flow out of the cavity.

5. The apparatus of claim 1, wherein said apparatus comprises a releasable stabilizer for drill string operations, and including exterior stabilizer blades attached to the hollow cylindrical member and having hardened peripheral surfaces.

6. The apparatus of claim 5, wherein the heating means comprises at least one electrical resistance means helically wound within the annular cavity about the inner surface of the hollow cylindrical member and including terminal means accessible from the exterior of the hollow cylindrical member for energizing the heating means.

7. The apparatus of claim 6, wherein said heating means comprises a pair of oppositely wound electrical resistance heating elements each having a pair of terminals accessible from the exterior of the hollow cylindrical member and wherein the pair of heating elements are positioned to at least partially overlap in the mid region of the hollow cylindrical member.

8. The apparatus of claim 5, wherein said hollow cylindrical member includes a pair of half cylinders including side edge tongue and groove means interlocking the pair of members into a single member having high circumferential strength.

9. The apparatus of claim 8, wherein the heating means comprises a pair of heating elements, each coupled to a different one of the two sections of the cylindrical element and each following a sinuous path to substantially intercept with relatively small spacing all portions of the associated part of the annular cavity, whereby no cold spots exist in the annular cavity, each heating element including means externally accessible to the hollow cylindrical member for providing electrical energization to the heating element, and releasable means engaging the pair of half cylinders for preventing relative longitudinal movement therebetween.

10. The apparatus of claim 1, wherein the apparatus comprises a roller reamer including external rollers mounted about the periphery of the cylindrical member and including rollers mounted to rotate around axes substantially parallel to the longitudinal axis of the cylindrical member.

11. The apparatus of claim 1, wherein the apparatus comprises a cylindrical hardband member having a hardened outer surface for resisting wear on the cylindrical body.

12. The apparatus of claim 1, said heating means comprising an electrical resistance element disposed along a sinuous path within the annular cavity to provide no more than a predetermined spacing between adjacent lengths of heating element, such that the entire annular cavity is heated when the electrical resistance element is energized, the electrical resistance element further comprising a cylindrical outer cover that is substantially nonreactive with the solid material, and an electrically insulating, thermally conductive filler material within the cover and about the heating element to provide electrical insulation, thermal conduction and absorption of mechanical forces.

13. The apparatus of claim 12, wherein the element is wound helically about the cylindrical body.

14. The apparatus of claim 12, wherein the sinuous path is disposed with major lengths along the transverse direction relative to the longitudinal axis of the cylindrical body and interconnecting minor lengths therebetween parallel to the longitudinal axis.

15. The apparatus of claim 12, wherein the element is wound sinuously with major lengths extending along the direction parallel to the longitudinal axis of the cylindrical body and interconnecting minor lengths transverse to the longitudinal axis.

16. Apparatus for releasably securing a drilling device to a drill string which comprises:
(a) a tubular element serving as part of a drill string;
(b) a collar forming part of a drilling device and fitted around said tubular element, with a space provided between the inner diameter of said collar and the outer diameter of said tubular element;
(c) a solid material in said space, said material being meltable in the range from about 500° F. to above 1000° F.; and
(d) an internal heater means in said space for remelting said material.

17. The invention as set forth in claim 16 above, wherein the solid material fills the space between the collar and the tubular element and engages both opposing surfaces, and wherein the collar is shrunk onto the solid material, preloading the solid material in compression against the tubular element, whereby the collar is securely engaged to the tubular element to resist high torsional forces acting on the collar.

18. The invention as set forth in claim 17 above, wherein said solid material is a poured in place solidified zinc or zinc alloy.

19. The invention as set forth in claim 18 above, wherein the internal heater means is an electrical heater and includes means accessible from the exterior of the collar for energizing the heater means with an electrical current, the heater means extending in a sinuous path to intercept the space between the collar and the tubular element, such that the sinuous path assures that the solid material may relatively quickly be remelted in substantially uniform fashion.

20. The invention as set forth in claim 19 above, including in addition means coupled to the collar and tubular element for providing a terminal seal for the solid material when flowed into place, said seal means including removable means for permitting egress of remelted material from the space.

21. A stabilizer apparatus for positioning on a drill string which comprises:
(a) a cylindrical stabilizer body positioned around a cylindrical surface of a drill string member, the inner diameter of said stabilizer body being greater than the outer diameter of said drill string member, so as to provide an annular space between said stabilizer body and said drill string member;
(b) a heating means mounted adjacent said inner surface of said stabilizer body; and
(c) a low melting point solid material disposed in said annular space, said stabilizer body being heat shrunk onto said solid material, and said stabilizer body and said solid material thereby being press fitted on said drill string member, and thus nonrotatably attaching said stabilizer body on said drill string member, said low melting point material being capable of flowing and of being removed from said annular space when said material is heated to its melting point by said heating means, for releasing said stabilizer body from said drill string member.

22. The stabilizer apparatus of claim 21, said low melting point material being zinc or a zinc alloy.

23. The stabilizer apparatus of claim 21, said heating means being a heating coil extending helically along the axial length of said stabilizer body, and said apparatus further comprising a protective outer sheath encompassing the heating coil and means sealing the solid material from the heating coil.

24. The stabilizer apparatus of claim 23, said heating coil being Nichrome wire, and said protective outer sheath being a stainless steel sheath.

25. The stabilizer apparatus of claim 2, said heating means being in the form of two helical sections which are wound oppositely, including terminals on each of said sections and adapted to be connected to a supply voltage.

26. A releasable stabilizer for positioning on a drill string member disposed in a bore hole, which comprises:
(a) a cylindrical stabilizer body having an inner cylindrical surface positioned axially around a cylindrical surface of a drill string member, the inner diameter of said stabilizer body being greater than the outer diameter of said drill string member, so as to provide an annular space between said stabilizer body and said drill string member;
(b) a heating element mounted adjacent the inner cylindrical surface of said stabilizer body, said heating element comprising an electrical resistance rod within a protective outer sheath, and extending axially substantially along the entire length of said stabilizer body;
(c) electrical terminal means on the heating element and accessible through the stabilizer body for connecting a power source to said heating element;
(d) removable seal means disposed adjacent at least one end of the stabilizer body for sealing the annular space; and
(e) a solid material selected from the group consisting of zinc and zinc alloys, disposed in and filling said annular space substantially along the entire axial length of said stabilizer body, said stabilizer body being heat shrunk onto said solid material, and said stabilizer body and said solid material thereby being press fitted on said drill string member, and thus non-rotatably attaching said stabilizer body on said drill string member, said solid material being capable of being heated by said heating element to a temperature to cause said zinc or zinc alloy to flow and to be removed from said annular space, for releasing said stabilizer body from said drill string member.

27. The stabilizer of claim 26 above, wherein said removable seal means is disposed at both ends of the stabilizer body and includes gasket means for confining the solid material when in a flowable state and closable fill and drain means for the material.

28. The stabilizer of claim 26 above, wherein said stabilizer body comprises a pair of longitudinally divided sections including longitudinal edge tongue and grooves registering in mating relation, at least one transverse tapered bore within the two sections of the stabilizer body and a tapered locking pin releasably registered in the transverse bore.

29. The method of releasably attaching a drill tool to a drill collar or other tubular member of a drill string comprising the steps of:
   defining a cavity between the outer surface of the tubular member and the inner surface of an encompassing drill tool;
   preheating the drill tool;
   pouring a low melting point fill material into the cavity to substantially fill the cavity;
   solidifying the fill material in place to mechanically unite the drill tool and tubular member by transferring heat primarily to the tubular member, such that the drill tool heat shrinks onto the fill material and preloads it under compression onto the tubular member; and
   remelting the fill material to remove the drill tool.

30. The method as set forth in claim 29 above, wherein an internal heating element is disposed in the cavity and further including the steps of:
   pouring the fill material into the cavity about the heating element; and
   remelting the fill material by energizing the heating element.

31. The method as set forth in claim 30 above, wherein the cavity is cylindrical in shape and the fill material is a metal having a melting point in the range from 500°–1000° F.

32. The method as set forth in claim 31 above, wherein the drill tool is preheated to the range of 300°–500° F., and wherein the cylindrical cavity is configured to provide a high surface area load distributing volume.

33. The method as set forth in claim 22, further including the steps of sealing the cavity prior to pouring the fill material and opening the cavity prior to remelting the fill material.

34. A process for mounting and removing a tool relative to a drill string, which comprises the steps of:
   (a) positioning a cylindrical tool body around a cylindrical surface of a drill string member at a selected location on the drill string, the inner diameter of said tool body being greater than the outer diameter of said drill string member, so as to provide an annular space between said tool body and said drill string member, said tool including
      (1) an electrical heating coil mounted within a protective sheath, and extending along the inner surface of said tool body for substantially the entire axial length of said tool body, and
      (2) electrical terminals at opposite ends of said heating coil;
   (b) connecting said electrical power source to said terminals to preheat said tool body;
   (c) pouring a low melting point non-reactive molten material into said heated annular space to fill said space with said molten material;
   (d) removing said power source and permitting said low melting point material to solidify, said preheating of said tool body causing said tool body to heat shrink onto said material during solidification thereof, and said tool body and said solid material thereby being press fitted on said drill string member;
   (e) lowering said drill string member and said tool body into a bore hole for a period of use;
   (f) removing said drill string member and said tool body thereon from said bore hole;
   (g) attaching a power source to said terminals on said tool body and heating said solid low melting point material to a temperature causing said material to become molten and to flow;
   (h) removing said molten material from said annular space;
   (i) removing said power source; and
   (j) removing said tool body from said drill string member.

35. The process of claim 34, said low melting point material being zinc or a zinc alloy, and wherein the preheat temperature is in the range of 300°–500° F.

36. The process of claim 35, wherein said molten material is poured into said heated annular space at the upper end of a vertically mounted tool body to permit flow of said molten low melting point material downwardly in said annular space.

37. The process of claim 35, wherein the tool body is mounted horizontally and further including the step of sealing the annular space at both ends of the body to permit filling of the annular space.

38. The process of claim 35, including supporting said tool in position during said pouring of said low melting point molten material into said annular space and sealing said molten material in said annulus until said molten material solidifies.

* * * * *